(12) United States Patent
Freeman

(10) Patent No.: US 10,012,729 B2
(45) Date of Patent: Jul. 3, 2018

(54) TRACKING SUBJECTS USING RANGING SENSORS

(71) Applicant: Disney Enterprises, Inc., Burbank, CA (US)

(72) Inventor: Kyle G. Freeman, Agoura, CA (US)

(73) Assignee: Disney Enterprises, Inc., Burbank, CA (US)

( * ) Notice: Subject to any disclaimer, the term of this patent is extended or adjusted under 35 U.S.C. 154(b) by 610 days.

(21) Appl. No.: 14/489,216

(22) Filed: Sep. 17, 2014

(65) Prior Publication Data

US 2016/0077207 A1 Mar. 17, 2016

(51) Int. Cl.

| | | |
|---|---|---|
| *G01C 3/08* | (2006.01) | |
| *G01S 15/66* | (2006.01) | |
| *G01S 17/42* | (2006.01) | |
| *G01S 17/66* | (2006.01) | |
| *G01S 17/89* | (2006.01) | |
| *G01S 7/48* | (2006.01) | |
| *G01S 15/42* | (2006.01) | |
| *G01S 15/89* | (2006.01) | |

(52) U.S. Cl.
CPC ............ *G01S 15/66* (2013.01); *G01S 7/4808* (2013.01); *G01S 15/42* (2013.01); *G01S 15/89* (2013.01); *G01S 17/42* (2013.01); *G01S 17/66* (2013.01); *G01S 17/89* (2013.01)

(58) Field of Classification Search
CPC ........ G01S 15/66; G01S 7/4808; G01S 15/42; G01S 15/89; G01S 17/42; G01S 17/66; G01S 17/89
See application file for complete search history.

(56) References Cited

U.S. PATENT DOCUMENTS

| | | | | |
|---|---|---|---|---|
| 2010/0208234 | A1* | 8/2010 | Kaehler | G01S 7/4802 356/5.01 |
| 2010/0238182 | A1* | 9/2010 | Geisner | G06T 13/00 345/474 |
| 2011/0230263 | A1* | 9/2011 | Ng | A63F 13/213 463/31 |
| 2012/0173185 | A1* | 7/2012 | Taylor | G01B 11/026 702/104 |
| 2013/0278501 | A1* | 10/2013 | Bulzacki | G06F 3/017 345/157 |
| 2014/0125966 | A1* | 5/2014 | Phillips | G01S 7/4813 356/4.01 |
| 2014/0307927 | A1* | 10/2014 | Folmer | A61B 5/7267 382/107 |

OTHER PUBLICATIONS

Shackleton et al., "Tracking People with a 360-Degree Lidar", 7th IEEE International Conference on Advanced Video and Signal-Based Surveillance, 2010, 7 pages.

* cited by examiner

*Primary Examiner* — Samantha K Abraham
(74) *Attorney, Agent, or Firm* — Sheppard Mullin Richter & Hampton LLP

(57) ABSTRACT

Systems and methods for tracking subjects within a three-dimensional physical environment are presented herein. A ranging sensor is mounted at a sensor location in the environment. The ranging sensor generates sensor output. The sensor output includes detected ranges of surfaces present in the environment as a function of orientations of the ranging sensor. Characteristics of the surface are determined using the detected ranges and orientations as polar coordinates of the surfaces.

32 Claims, 4 Drawing Sheets

TRACKING SUBJECTS USING RANGING SENSORS

FIELD OF THE DISCLOSURE

This disclosure relates to systems that use sensor output of a ranging sensor as polar coordinates of surfaces present in an environment to identify static surfaces and moving surfaces, and track the moving surfaces within the environment.

BACKGROUND

Ranging sensors are used to detect surfaces that are present in a three-dimensional physical environment. Types of ranging sensor include, without limitation, sonic ranging sensors and light detection and ranging (LIDAR) sensors.

SUMMARY

One or more aspects of the disclosure relates to a system for tracking moving surfaces within a three-dimensional environment using sensor output from one or more ranging sensors. Sensor output of the one or more ranging sensor includes detected ranges of surfaces at different orientations of the ranging sensors. The detected ranges and orientations are used as polar coordinates of the surfaces to determine one or more characteristics of the surfaces and to track moving surfaces.

The system includes one or more processors in communication with the one or more ranging sensors. The one or more processors are configured to execute one or more computer program components. The computer program components include one or more of a receiving component, a static surface identification component, a subject identification component, and a subject tracking component.

The receiving component is configured to receive sensor output from the one or more other ranging sensors. A given ranging sensor is rotationally mounted at a sensor location in an environment. The sensor output includes detected ranges of surfaces as a function of orientations of the ranging sensor.

The static surface identification component is configured to use the detected ranges and orientations as polar coordinates of the surfaces in the environment to determine one or more characteristics of the surfaces. The one or more characteristics determined include whether the surface is a static surface or a moving surface and whether the surface includes an obscured edge or a non-obscured edge of a volume bounded by the surface. For example, determining whether the surface is a static surface or a moving surface is based on whether the polar coordinates of the surface change over time.

The subject identification component is configured to use the detected ranges and orientations as polar coordinates of surfaces in the environment to determine characteristics of the surfaces including whether a moving surface is associated with a human being or other subject, such as an animal or a particular object. For example, if it a surface is determined to be characterized as a moving surface, the subject identification component is configured to determine whether the surface is associated with a human being such that the surface is identified as a moving human subject. Determining that the surface is associated with a human being comprises determining whether a volume bounded by the surface has a size, shape, and/or form that is indicative of a size, shape, and/or form corresponding to that of a human being, or more specifically, a human head.

The subject tracking component is configured to establish a track between locations of the moving surface that are detected over periods of time.

DETAILED DESCRIPTION

Figure 1:
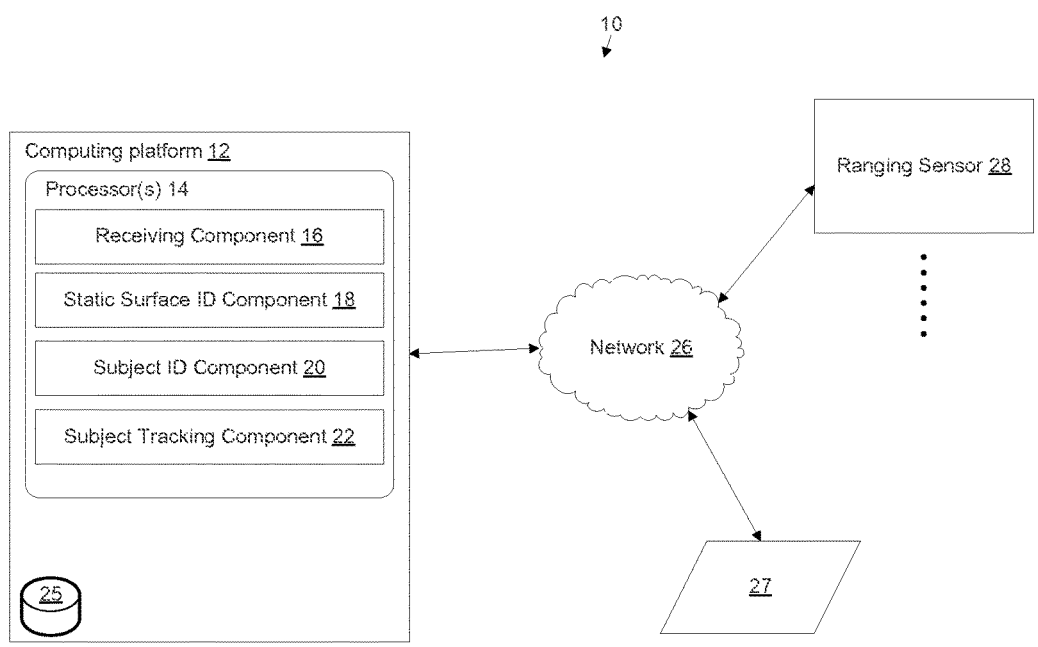
FIG. 1 illustrates a system for tracking subjects within a three-dimensional environment, in accordance with one or more implementations.

FIG. 1 illustrates a system 10 for tracking subjects within a three-dimensional physical environment. An environment includes a closed environment or an open environment. A closed environment includes, for example, an indoor space such as a room, a building, a hallway, a vehicle, and/or an entryway. An open environment includes, for example, an outdoor space such as a park.

An environment will include one or more static surfaces and/or one or more moving surfaces. Surfaces are detected by a ranging sensor 28 that is mounted at a sensor location in the environment. The sensor output of the ranging sensor 28 includes detected ranges of surfaces of the environment as a function of orientations of the ranging sensor 28. The detected ranges and orientations are used as polar coordinates of the surfaces to determine the one or more characteristics of the surfaces. The one or more characteristics determined include whether the surface is a static surface or a moving surface, whether the surface includes an obscured edge or a non-obscured edge of a volume bounded by the surface, and whether the surface is associated with a human being. Determining whether a surface is a static surface or a moving surface is based on whether the polar coordinates of the surface change over time. This is accomplished by matching detected surface over periods of time using the polar coordinates of the surfaces, and determining whether the polar coordinates have changed. Static surfaces are also identified by determining that detected surfaces correspond to a largest detected range at a given orientation from the sensor location. Static surfaces include surfaces of a wall, a ceiling, a floor, a structural element, a support pillar in a room, or a piece of furniture.

Surfaces of moving subjects are detected using the sensor output of the ranging sensor 28. A characteristic of a moving surface is that the polar coordinates of the surface change over time. Additional determined characteristics of a moving surface include whether the moving surface is associated with a human being. Determining that the surface is associated with a human being comprises determining whether a volume bounded by the surface has a size, shape, and/or form that is indicative of a size, shape, and/or form corresponding to that of a human being.

A surface is identified by a grouping of measurements included in the sensor output. The measurements represent points on the surface. The measurements are inherently grouped based on their measured ranges and/or orientations.

A group of measurements include measured ranges of a surface (e.g., distance from the sensor location) and orientations with respect to the ranging sensor during a period of time at which the group of measurement were taken. The groups of measurements are used to determine a sizes, shapes, and/or forms of volumes bounded by the surfaces.

Different surfaces are distinguished by determining a break in between the surfaces. A break in a given surface is represented by measurements representing points on the given surface and an adjacent surface. The break is identified when the measurements include measured ranges for the points on the adjacent surface that are either too far or too near to the sensor location compared to the detected range(s) of the given surface to be considered part of the given surface. Briefly, identifying breaks is used to determine whether edges of surfaces are obscured by objects/surfaces closer to the sensor location then the surface itself, or non-obscured such that an identified edge is the true edge of the surface.

The system 10 presented herein provides techniques in which the characteristics of surfaces are determined, and wherein moving subjects are identified and tracked. In some implementations, sensor output of the ranging sensor 28 is used to make a three-dimensional virtual reconstruction of the physical environment for tracking moving subjects. Sensor output related to the identified static surfaces is disregarded during processing of the sensor output for tracking identified moving surfaces to further reduce computational efforts.

The ranging sensor 28 is a sonic ranging sensor, a light detection and ranging (LIDAR) sensor, or other ranging sensor. The ranging sensor 28 performs one or more "sweeps" of the environment. A "sweep" of the environment corresponds to a period of time where one or more rotations, movements, and/or other processes are performed by ranging sensor 28. For example, a LIDAR sensor includes one or more laser emitters and detectors. The LIDAR sensor performs a "sweep" of an environment that comprises a 360 degree (or other amount) horizontal rotation of the sensor. The LIDAR sensor performs a 180 degree (or other amount) vertical rotation of the sensor at predetermined intervals of the horizontal rotation (e.g., every degree and/or fraction of a degree). In some implementations, more or less rotation is performed depending on the quantity, orientation, and/or other parameter of the emitters, detectors, and/or other components included in the LIDAR or other sensor. The ranging sensor 28 is configured to perform one or more sweeps over a predetermined period of time. For example the ranging sensor 28 may perform 2 (or other amount) sweeps per second (or other period of time).

The detected ranges of surfaces at orientations of the ranging sensor 28 are used as coordinates of the surfaces in the environment. The coordinates of the surfaces may correspond to polar coordinates, spherical coordinates, cylindrical coordinates, and/or other considerations of coordinates and/or a coordinate system suitable to define the location of surfaces in the environment with respect to the sensor location.

Figures 2, 2A:
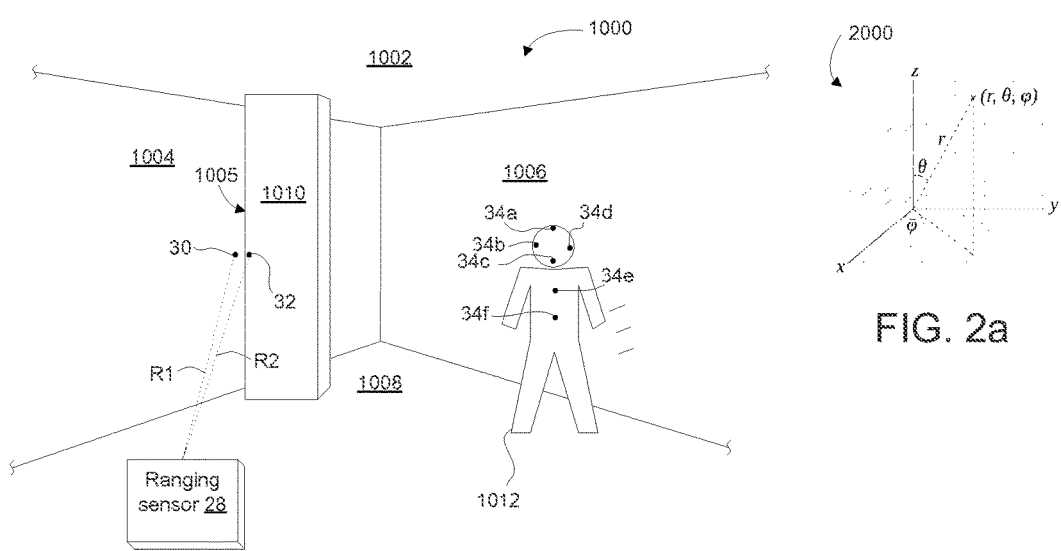
FIG. 2 illustrates an implementation of a ranging sensor in a three-dimensional environment, in accordance with one or more implementations of the system presented herein.
FIG. 2A illustrates an implementation of a coordinate system within a three-dimensional environment.

As an illustrative example in FIG. 2, the ranging sensor 28 is positioned at a sensor location in an environment 1000. The ranging sensor 28 is configured to generate sensor output that comprises multiple measurements. A given measurement represents a point on a surface and includes a measured range and orientation with respect to the sensor location. A given measurement provides a coordinate of the point on a surface in environment 1000 at a point in time that the measurement was taken. A measurement represents a coordinate defined by one or more of a radial distance of the detected point on the surface from ranging sensor 28, a polar angle measured from a fixed zenith direction (e.g., vertical orientation with respect to the sensor location), and an azimuth angle of an orthogonal projection of the point on a reference plan that is orthogonal to the zenith direction (e.g., horizontal orientation with respect to the sensor location).

FIG. 2a illustrates an exemplary coordinate system 2000. Such a coordinate system 2000 is used for the defining the measurements including the detected ranges as a function of orientations of the ranging sensor 28. Such a coordinate system 2000 is used by considering its origin to be located at the sensor location of ranging sensor 28, with the zenith direction aligned with the vertical and the reference plan for the azimuth angle being a horizontal ground surface or floor of the environment. An individual measurement is represented by radial distance "r" being the distance from the sensor location, polar angle "θ" (e.g., vertical orientation from sensor location at the point in time a measurement is taken), and/or azimuth angle "φ" (e.g., horizontal orientation from the sensor location at a point in time a measurement is taken). A radial distance "r" and/or a polar angle "θ" associated with a given measurement represents a polar coordinate of the measurement as function of a horizontal orientation (e.g., azimuth angle "φ") from the sensor location.

Returning to FIG. 1, system 10 comprises one or more computing platforms, such as computing platform 12. Computing platform 12 includes one or more processors 14 configured to execute one or more computer components for receiving sensor output including detected ranges of surfaces and orientations, processing the sensor output for determining characteristics of the surfaces, identifying moving subjects (e.g., human beings) present in the physical environment, and tracking the movement of identified moving subjects throughout the environment over time. The computing platform 12 includes, for example, a cellular telephone, a smartphone, a laptop, a tablet computer, a desktop computer, or a host server. The computer program components include one or more of a receiving component 16, a static surface identification component 18, a subject identification component 20, and a subject tracking component 22.

The receiving component 16 is configured to receive sensor output from the ranging sensor 28. The sensor output includes detected ranges of surfaces as a function of orientations of the ranging sensor 28. Receiving the sensor output from the ranging sensor 28 is facilitated through information exchange between the ranging sensor 28 and the computing platform 12 (e.g., receiving component 16), for example, over network 26. Information is exchanged through wired and/or wireless communications established between the ranging sensor 28 and the computing platform 12. For example, the ranging sensor 28 and/or the computing platform 12 are enabled for radio frequency communication, wired communication (e.g., USB and/or other wired connection through respective ports), and/or other communication scheme and/or protocol.

The ranging sensor 28 and/or the computing platform 12 may include one or more antennas configured for Bluetooth® enabled communications, Wi-fi, near-field communication (NFC), and/or one or more ports configured to enable wired communications. As such, it is noted that network 26 is configured to facilitate one or more of the wired and/or wireless communications presented herein.

The network 26 represents a wide area network (WAN) such as the internet, a local area network (LAN), and/or a wired network.

The receiving component 16 is configured to receive sensor output from the ranging sensor 28 through active or passive communications with the ranging sensor 28. For example, the computing platform 12 pings the ranging sensor 28 for requests for sensor output (e.g., by virtue of user input and/or at predetermined intervals). As another example, the ranging sensor 28 actively communicates sensor output to the computing platform 12 (e.g., the receiving component 16) in real-time (or near-real time) as the sensor output information is generated by the ranging sensor 28 (e.g., as the ranging sensor 28 performs sweeps of the environment).

Figure 3:
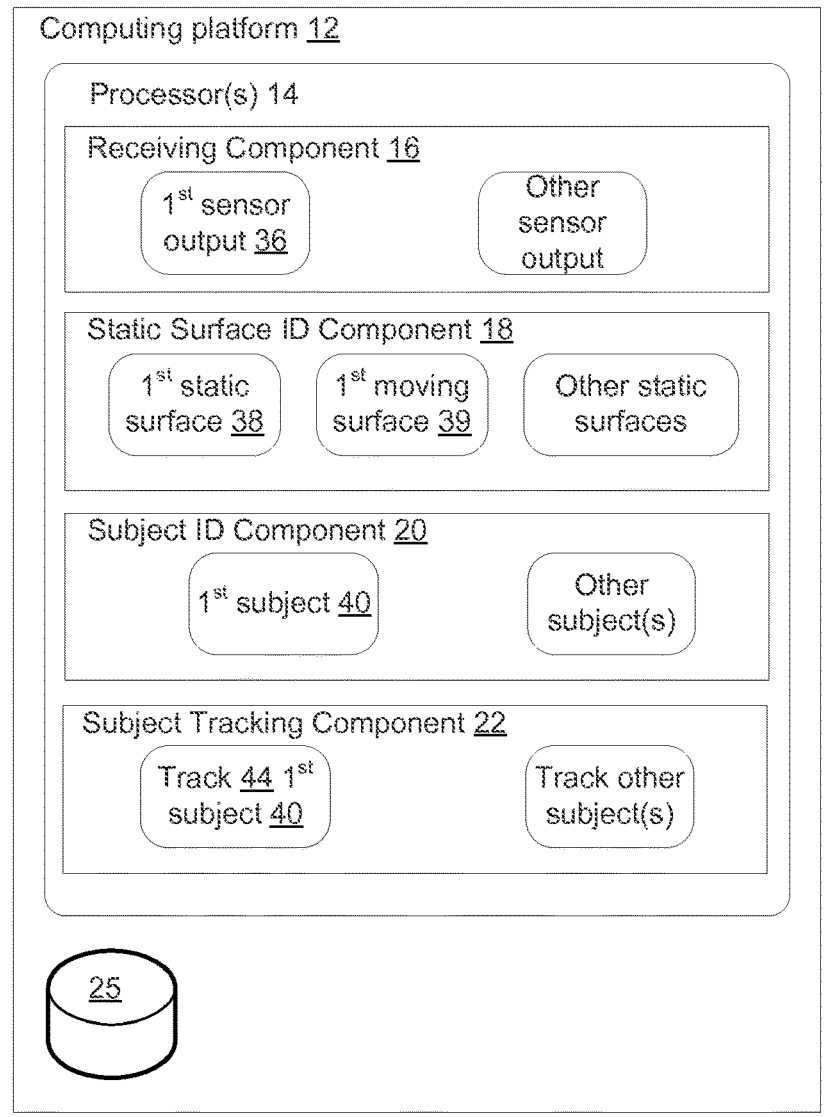
FIG. 3 illustrates an implementation of a computing platform employed in the system of FIG. 1.

As an illustrative example, in FIG. 3, receiving component 16 is configured to receive first sensor output 36 from a first ranging sensor (e.g., ranging sensor 28 shown in FIG. 2). The first sensor output 36 includes output related to one or more sweeps of an environment (e.g., environment 1000 in FIG. 2) over a period of time. The first sensor output 36 may represent sensor output that is generated by the first ranging sensor and received by the computing platform 12 in real time, near real-time, and/or other considerations. The first sensor output 36 received by receiving component 16 includes multiple measurements representing polar coordinates of points on surfaces.

As a further illustrative example in FIG. 2, sensor output from the ranging sensor 28 (e.g., first sensor output 36 in FIG. 3) includes one or more of a first measurement representing a polar coordinate of a first point 30 on a surface, a second measurement representing a polar coordinate of a second point 32 on a surface, a third measurement representing a polar coordinate of a third point 34a on a surface, a fourth measurement representing a polar coordinate of a fourth point 34b on a surface, a fifth measurement representing a polar coordinate of a fifth point 34c on a surface, a sixth measurement representing a polar coordinate of a sixth point 34d on a surface, a seventh measurement representing a polar coordinate of a seventh point 34e on a surface, an eighth measurement representing polar coordinate of an eighth point 34e on a surface, a ninth measurement representing a polar coordinate of a ninth point 34f on a surface, and/or other measurements.

The first point 30 is a point on a first static surface 1004 (e.g., a wall). The second point 32 is a point on a second static surface 1010 (e.g., a pillar). The points 34a-f are points on a first moving surface 1012 (e.g., a moving human subject). It is noted that sensor output may include more or less measurements representing additional points on surfaces in addition to those described above. For example additional measurements may represent points on other static surfaces 1002, 1006, 1008 (e.g., a ceiling, a wall, a floor, respectively) or other moving surfaces (not shown).

The group of measurement for points 34a-f are considered a first group of measurements during a period in time the measurements were taken (e.g., during one sweep). The first group of measurements are inherently grouped based on the measured ranges and orientations included in the measurements of the points 34a-f that identify a common, continuous surface. A continuous surface is identified by a grouping of adjacent measurements that do not include breaks (e.g., discontinuities) in the measured ranges. A break in a given surface is identified when the difference between measure ranges of adjacent points on surfaces breaches a threshold. That is, measurements of adjacent points that have measured ranges that do not differ more than a threshold are grouped together as identifying a common, continuous surface.

The breaks in surfaces are used to identify edges of the surfaces. If a measurement includes a detected range of a first point on a given surface that is adjacent to at least one other point in a group of points representing a continuous surface, and the detected range of the first point is too far from the sensor location to be grouped with the points on the continuous surface (e.g., indicating a break), then a true, non-obscured edge of the continuous surface is identified as being located between the first point and the a least one other point on the continuous surface. If a measurement includes a detected range of a first point on a given surface that is adjacent to at least one other point included in a group of points representing a continuous surface, and the detected range of the first point is too near to the sensor location to be grouped with the group of points representing the continuous surface (e.g., indicating a break), then an obscured edge of the continuous surface is identified as being located between the point and at least one other adjacent point located on the continuous surface (e.g., the true edge is located behind the given surface and is not detectable by the ranging sensor).

As an illustrative example, consider a continuous surface of a static wall (or other surface and/or subject) that is positioned a fixed distance from the ranging sensor. The sensor output of the ranging sensor 28 will include measurements representing points on the wall that are inherently grouped based on the measured ranges (e.g., any two adjacent points do not differ more than a threshold amount that would indicate that the points do not lie on the same, continuous wall surface). For example, the measurements of two adjacent points (e.g., adjacent by virtue of adjacent orientations from sensor location) are compared to determine if the spatial separation between the points breaches a threshold thereby indicating a discontinuity of surfaces in between the points (e.g., one point is a point on a surface of an object between the wall and the sensor location, and another point is a point on the wall). A discontinuity will correspond to a spatial separation that breaches a threshold. For example, the threshold may be 1 millimeter, 5 millimeters, a centimeter, 5 centimeters, 10 centimeters, 50 centimeters, and/or other distance.

As further example, if a measurement of a point of a surface at a given orientation includes a measured range of 5.00 meters, and five other measurements of five other points on surfaces positioned at adjacent orientations include measured ranges of 5.01 meters, 5.02 meters, 5.03, meters, 5.04 meters, 5.05 meters, than it is determined that the points represented by this group of measurements represent a continuous surface. Conversely, if a measurement of a point includes a measured range of 5.00 meters, and five other measurements of five other points positioned at adjacent orientations include measured ranges of 5.01 meters, 5.02 meters, 3.40, meters, 3.41 meters, 5.05 meters, than it is determined, based on the discontinuity in the ranges (e.g., a relatively large spatial separation), that the points represented by this group of measurements do not represented a common, continuous surface. As described above, adjacent points representing discontinuities (large spatial separation) in the measured ranges are used to determine edges of surfaces.

By analyzing the sensor output as polar coordinates of points on surface, computational analysis to identify and distinguish between surfaces requires one-to-one comparisons between adjacent points to determine whether or not a there is a discontinuity between the adjacent points (e.g., a difference in measure range breaching a threshold). Since the detected range and orientation is inherently provided by polar coordinates of the points on surfaces (e.g., and/or spherical and/or cylindrical coordinates), processing by a computing platform (e.g., computing platform 12 in FIG. 1) to determine if adjacent points lie on a continuous surface or if an edge exists between the two points is performed with minimal computational effort (e.g., compared to using detected range and orientation as Cartesian coordinates requiring high order mathematical analysis).

Returning to FIG. 1, static surface identification component 18 is configured to use the detected range and orientation as polar coordinates of surfaces in the environment to determine one or more characteristics of the detected surfaces. A characteristic determined includes whether the surfaces are static surfaces or moving surfaces. For example, determining whether a surface is a static surface or a moving surface is based on whether the polar coordinates of the surface change over time. Determining whether a surface is a moving surface or a static surface is accomplished by analyzing the detected surfaces over periods of time, matching detected surface from one period of time to another period in time, and determining if the polar coordinates of matched surfaces change over time.

A size, shape, form, and/or other distinguishing characteristic of a detected surface, and/or volume bounded by the surface, is determined by using the measurements included in the group of measurements that represent the surfaces during a period of time when the measurements are taken (e.g., a sweep). The spatial separation between points located at edges of the surface is determined using the polar coordinate of the points. For example, distance formulas to determine distances between points in three-dimensions using the polar coordinates are used.

The special separation between edges is then used to determine a height, a width, a depth, a center, a surface area, a volume, and/or other characteristic of the surface and/or the volume bounded by the surface. A pitch of the surface is determined using the group of measurements. A surface normal of the surface is determined using the group of measurement. For example, surface pitch, surface normal, and/or other characteristic are determined by applying algorithms that use polar, spherical, and/or cylindrical coordinates included in the measurements of the points on the surface to determine a pitch, normal, gradient, slope, spacing, and/or other characteristic of the surface represented by the measurements. Calculating surface normal and/or surface pitch facilitates the determination of curvature and/or other characteristic of the surface.

By determining size, shape, form, and/or other distinguishing characteristic of detected surfaces, and/or volumes bounded by the surfaces over periods of time (e.g., every sweep), surfaces are matched over time. The polar coordinates of matched surfaces are compared to determine whether the surface moved or has remained static over a period of time.

In some implementations, identifying static surfaces of the environment comprises determining the surfaces in the environment that correspond to the largest detected range (e.g., radial distance from sensor location) at given orientations over a period of time (e.g., one or more sweeps of ranging sensor 28). At a given orientation (e.g., a given polar and/or azimuth angle), the ranging sensor 28 detects different ranges for surfaces over time, for example, due to subjects moving throughout the environment. By using the detected range and orientation of surfaces as polar coordinates (e.g., including radial distance), the surfaces detected at the largest ranges (e.g., largest radial distance) inherently identify the static surfaces of the environment since no surface farther than that at the largest range has been detected. Since this identification is inherent when using the sensor output as polar coordinates (e.g., by referencing the radial distance at given orientations), the processing performed by the one or more processors 14 of computing platform 12 for identifying static surfaces is performed with minimal or reduced computational effort (e.g., compared to using sensor output as Cartesian coordinates requiring complex analysis). However, such techniques for identifying static surfaces may not be suitable for crowded environments having many moving subjects (where all detected surfaces are moving), or environments wherein the static surfaces are too far from the sensor location to provide accurate detected ranges.

As an illustrative example in FIG. 2, first measurement of the first point 30 corresponds to a first orientation of the ranging sensor 28 (e.g., a given polar angle and/or azimuth angle). The first point 30 corresponds to a measured range (e.g., radial distance) from sensor location at the first orientation, e.g., distance "R1" at a point in time the first measurement was taken. If, for example, over a subsequent periods of time, ranging sensor 28 provides sensor output at the first orientation including detected ranges other than R1, however with the radial distance R1 being the largest measured radial distance, then the first point 30, which corresponds to radial distance R1, identifies a static surface (e.g., first static surface 1004) present in environment 1000. Other measurements of other points (not shown) are used to determine polar coordinates for the entirety of the first static surface 1004.

As another illustrative example, consider the second measurement of the second point 32. The second point 32 corresponds to a second orientation of the ranging sensor 28 and a detected range of "R2" at a point in time the second measurement was taken. For illustrative purposes, the first orientation associated with first point 30 is an orientation that is at least horizontally adjacent (e.g., based on azimuth angle) to the second orientation associated with the second point 32. If, for example, the detected ranges R1 and R2 indicate a spatial separation of the corresponding detected surfaces that breach a threshold (e.g., 5 meters for R1 compared to 3 meters for R2, with a threshold of 0.1 meters and/or other threshold), then the surfaces represented by first point 30 and second point 32 are determined as not being a continuous, common surface, e.g., the second static surface 1010 represented by the second point 32 is not continuous with the first static surface 1004. It is also determined that an edge 1005 is located at least at the location between the first point 30 and the second point 32, and, due to the second point 32 being closer to the sensor location than the first point, the edge 1005 is a true edge of the second static surface 1010. Additional comparisons of measurement of points that indicate a break or discontinuity between first static surface 1004 and second static surface 1010 are used to identify the entirety of edge 1005.

The first group of measurements of the first group of points 34*a-f* are used to determine a size, shape, form, and/or other distinguishing characteristics of a volume bounded by the surface at a first period in time the measurements were taken. The surface and/or volume bounded by the surface is characterized as moving if the surface is matched with a surface detected at a subsequent period in time, wherein the matched surface has polar coordinates that are different than the polar coordinates associated with first group of measurements taken at the first period in time.

In some implementations, a surface is characterized by analyzing measured ranges at given orientations. Consider, for example, the sixth measurement of the sixth point 34*d*. The sixth point 34*d* corresponds to range and orientation in the environment with respect to the sensor location. If, after a subsequent point in time from when the sixth measurement is taken, a different range is detected at the same orientation, it is determined that the surface that the sixth point 34*d* was lying on at the previous period in time identifies the first moving surface 1012. The first moving surface 1012 is then matched with surfaces detected at subsequent periods in time for purposes of tracking the first moving surface 1012.

As a further illustrative example in FIG. 3, the static surface identification component 18 is configured to determined, using the first sensor output 36 as polar coordinates, a surface in the environment as being a first static surface 38 (e.g., first static surface 1004 in FIG. 2) and a surface in the environment as being a first moving surface 39 (e.g., first moving surface 1012 in FIG. 2).

Returning to FIG. 1, the subject identification component 20 is configured to use the detected ranges and orientations of surfaces as polar coordinates of surfaces to determine additional characteristics of moving surfaces. The additional characteristics determined include whether the surface is associated with a human being. The determination is based on the size, shape, form, and/or other distinguishing characteristic of the surface. The subject identification component 20 identifies a moving surface as a human moving subject for tracking (e.g., using the subject tracking component 22).

Constraints on size, shape, form, and/or other distinguishing characteristic of different subjects are known and distinguishable from one another. The size, shape, form, and/or other distinguishing characteristic of detected surfaces of a dog are distinguishable from the size, shape, form, and/or other distinguishing characteristic of detected surfaces of a human being based on known constraints for size, shape, form, and/or other distinguishing characteristic for dogs and/or human beings. As another example, the size, shape, form, and/or other distinguishing characteristic of detected surfaces of a human female is distinguishable from the size, shape, form, and/or other distinguishing characteristic of detected surfaces of a human male. As yet another example, the size, shape, form, and/or other distinguishing characteristic of detected surfaces of a human carrying an object (such as a briefcase) is distinguishable from the size, shape, form, and/or other distinguishing characteristic of detected surfaces of a human not carrying anything. As still another example, the size, shape, form, and/or other distinguishing characteristic of detected surfaces of a particular type of furniture (e.g., a couch) are known and used to distinguish from other types of furniture and/or other static and/or moving object.

Information used to facilitate determining correlations between determined size, shape, and/or form of detected surfaces and known constraints on size, shape and/or form subjects are stored locally by computing platform 12 (e.g., data storage 25), retrieved from an external resources (e.g., external resource 27), and/or are made accessible to computing platform 12 in other ways. For example, known constraints for known types of subjects (e.g., a human being) are stored in data storage 25 and/or other storage location.

As an illustrative example in FIG. 2, the subject identification component 20 is configured to identify the first moving surface 1012 and/or volume bounded by the first moving surface 1012 encompassed by points 34*a-f* as a human being based on correlations of the determined size, shape, form, and/or other distinguishing characteristic of the first moving surface 1012 with known values for that of a human being. For example, consider the measurements for points 34*a-d*. The points 34*a-d* represent a part of the first moving surface 1012 that have a size, shape, form, and/or other distinguishing characteristic that correlates with known size, shape, form, and/or other distinguishing characteristic of that of a human head. Other distinguishing characteristics include curvature of the surface and/or surface area.

As an illustrative example in FIG. 3, subject identification component 20 is configured to determine that the first moving surface 39 identifies a first human subject 40 that is to be tracked.

Returning to FIG. 1, subject tracking component 22 is configured to, responsive to identifying moving subjects for tracking, track the movement of the identified moving subjects within the environment. Tracking is facilitated by techniques such as surface matching and/or other technique. Surface matching comprises using the sensor output as polar coordinates of surfaces to determine a size, shape, form, and/or other distinguishing characteristic of the moving surface and/or volume bounded by a first surface detected at a first period in time, using the sensor output as polar coordinates of surfaces to determine a size, shape, form, and/or other distinguishing characteristic of a second surface detected at a subsequent period in time, and determining if the size, shape, form, and/or other distinguishing characteristic of the first surface matches that of the second surface. Responsive to a match being determined, the subject tracking component 22 is configured to establish a track between the location of the first surface at the first period in time and the location of the second surface at the second period in time. The locations of the first surface and the second surface used for tracking are locations determined by measurements of points located at the centers of the surfaces, or other measurements.

The subject tracking component 22 is further configured to, responsive to a match not being determined, establish that a surface is no longer present in the environment or has moved outside the detectable range of the ranging sensor 28. In some implementations, surface matching is accomplished using spin images, and/or other surface matching techniques. Algorithms for verifying surface matches may be employed.

As an illustrative example in FIG. 3, the subject tracking component 22 is configured to, responsive to the identified first moving surface 39 being identified as the first moving subject 40, track 44 the movement of the first moving subject 40 (e.g., the volume bounded by the first moving surface 39) within the environment. Tracking the first moving subject 40 is accomplished by matching sizes, shapes, and/or forms of the volumes bounded by the first moving surface 39 over periods in time and establishing a track between the matched volumes.

Returning to FIG. 1, the computing platform 12, ranging sensor 28, and/or external resources 27 are operatively linked via one or more electronic communication links. For example, such electronic communication links are established, at least in part, via network 26 such as the Internet and/or other networks. It will be appreciated that this is not intended to be limiting, and that the scope of this disclosure includes implementations in which computing platform 12, ranging sensor 28, and/or external resources 27 are operatively linked via some other communication media.

The external resources 27 include sources of information, hosts and/or providers outside of system 10, external entities participating with system 10, and/or other resources. In some implementations, some or all of the functionality attributed herein to external resources 27 may be provided by resources included in system 10.

The computing platform 12 includes data storage 25. Data storage 25 includes one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Data storage 25 store files, software algorithms, information determined by processor 14, information received from computing platform 12, and/or other information that enables computing platform 12 to function as described.

Processor(s) 14 is configured to provide information processing capabilities in computing platform 12. Although processor 14 is shown in FIG. 1 as a single entity, in some implementations, processor 14 includes one or more processing units. The processor 14 is configured to execute code that implements components 16, 18, 20, and/or 22 by software; hardware; firmware; some combination of software, hardware, and/or firmware; and/or other mechanisms for configuring processing capabilities on processor 14.

Figure 4:
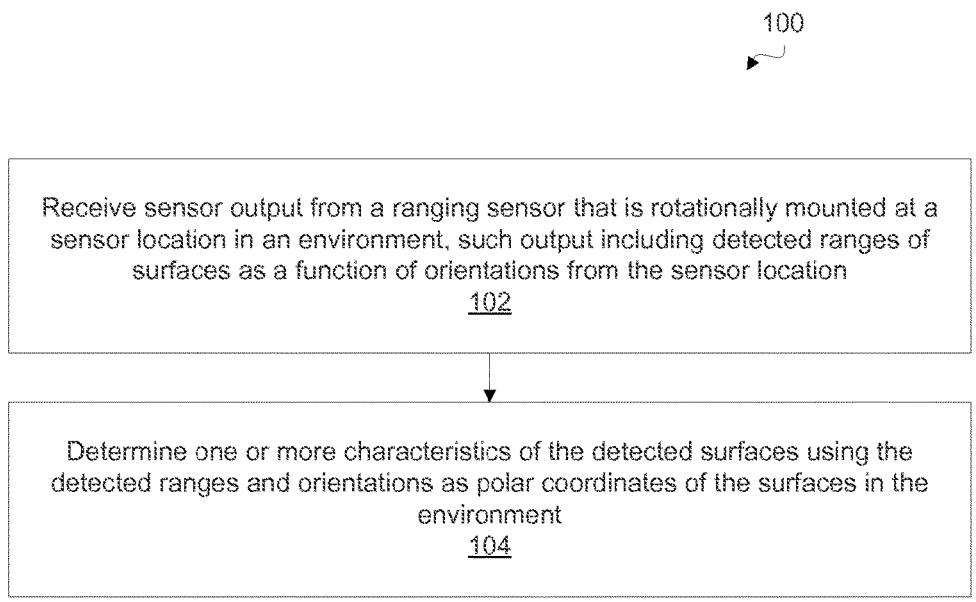
FIG. 4 illustrates an implementation of a method of tracking subjects within a three-dimensional environment, in accordance with one or more implementations.

FIG. 4 illustrates a method 100 of tracking subjects within a three-dimensional physical environment. The operations of method 100 presented below are intended to be illustrative. In some implementations, method 100 is accomplished with one or more additional operations not described, and/or without one or more of the operations discussed. Additionally, the order in which the operations of method 100 are illustrated in FIG. 4 and described below are not intended to be limiting.

Method 100 is implemented in one or more processing devices (e.g., a digital processor, an analog processor, a digital circuit designed to process information, an analog circuit designed to process information, a state machine, and/or other mechanisms for electronically processing information), and/or one or more other components. The one or more processing devices include one or more devices executing some or all of the operations of method 100 in response to instructions stored electronically on a data storage medium.

Referring now to method 100 in FIG. 4, at an operation 102, sensor output is received from a ranging sensor that is rotationally mounted at a sensor location in an environment. The sensor output includes detected ranges of surfaces as a function of orientations of the ranging sensor. In some implementations, operation 102 is performed by a receiving component the same as or similar to receiving component 16 (shown in FIG. 1 and described herein).

At an operation 104, one or more characteristics of the detected surfaces are determined using the detected ranges and orientations as polar coordinates of the surfaces in the environment. In some implementations, operation 104 is performed by a static surface identification component and/or a subject identification component the same or similar to static surface identification component 18 and/or subject identification component 20, respectively (shown in FIG. 1 and described herein).

Although the present technology has been described for illustration based on what is considered to be the most practical and preferred implementations, it is to be understood that such detail is solely for that purpose and that the technology is not limited to the disclosed implementations, but, on the contrary, should cover modifications and equivalent arrangements within the spirit and scope of the appended claims. It is to be understood that the present technology contemplates that, to the extent possible, one or more features of any implementation can be combined with one or more features of any other implementation.

What is claimed is:

1. A system for tracking subjects within a three-dimensional environment, the system comprising:
   one or more physical processors configured by computer-readable instructions to:
      receive sensor output from a ranging sensor that is rotationally mounted at a sensor location in an environment, such sensor output including detected ranges of surfaces of the environment as a function of orientations from the sensor location such that the ranges and the orientations of the surfaces are specified as polar coordinates with respect to a coordinate system origin at the sensor location; and
      identify a continuous surface of an object using the detected ranges and orientations as the polar coordinates by determining range changes between adjacent polar coordinates, wherein the continuous surface is identified based on the range changes between the adjacent polar coordinates of the continuous surface not differing more than a threshold distance, and wherein a surface location of the continuous surface as a whole is characterized by the adjacent polar coordinates which do not differ more than the threshold distance.

2. The system of claim 1, wherein the one or more physical processors are configured by the computer-readable instructions to determine whether the continuous surface is a static surface or a moving surface.

3. The system of claim 2, wherein the one or more physical processors are configured by the computer-readable instructions such that determining whether the continuous surface is a static surface or a moving surface is based on whether the polar coordinates of the continuous surface change over time.

4. The system of claim 1, wherein the one or more physical processors are configured by the computer-readable instructions to determine whether the continuous surface is associated with a human being.

5. The system of claim 4, wherein the one or more physical processors are configured by the computer-readable instructions such that determining that the continuous surface is associated with a human being comprises determining whether a volume bounded by the continuous surface has a size, shape, and/or form that is indicative of a size, shape, and/or form corresponding to that of a human being.

6. The system of claim 4, wherein the one or more physical processors are configured by the computer-readable instructions such that the determining that the continuous surface is associated with a human being comprises determining whether a volume bounded by the continuous surface has a size, shape, and/or form that is indicative of a size, shape, and/or form corresponding to that of a human head.

7. The system of claim 1, wherein the one or more physical processors are configured by the computer-readable instructions to determine whether the continuous surface includes an obscured edge or a non-obscured edge of a volume bounded by the continuous surface.

8. The system of claim 7, wherein the one or more physical processors are configured by the computer-readable instructions such that determining that the continuous surface includes an obscured edge comprises using detected ranges and orientations of a second surface that is positioned adjacent to the continuous surface, and determining whether the detected ranges of the second surface are closer to the sensor location than the detected ranges of the continuous surface.

9. The system of claim 7, wherein the one or more physical processors are configured by the computer-readable instructions such that determining that the continuous surface includes a non-obscured edge comprises using detected ranges and orientations of a second surface that is positioned adjacent to the surface, and determining whether the detected ranges of the second surface are farther from the sensor location than the detected ranges of the continuous surface.

10. The system of claim 1, wherein the one or more physical processors are configured by the computer-readable instructions such that the received sensor output comprises measurements representing measured ranges and orientations from the sensor location of points on the surfaces, wherein a first group of measurements include measured ranges and orientations of a set of points on the continuous surface at a period in time at which the first group of measurements were taken.

11. The system of claim 10, wherein the one or more physical processors are configured by the computer-readable instructions to determine a size, shape, and/or form of a volume bounded by the continuous surface based on the first group of measurements, wherein the first group of measurements is inherently grouped based on the measured ranges and orientations from the sensor location of the set of points.

12. The system of claim 11, wherein the one or more physical processors are configured by the computer-readable instructions such that the volume is determined to be associated with a human being based on whether the determined size, shape, and/or form of the volume corresponds to that of a human head.

13. The system of claim 11, wherein the one or more physical processors are configured by the computer-readable instructions to track the movement of the volume through the environment.

14. The system of claim 13, wherein the one or more physical processors are configured by the computer-readable instructions such that tracking the movement of the volume through the environment includes matching sizes, shapes, and/or forms of volumes bounded by surfaces represented by groups of measurements taken at subsequent periods in time with the size, shape, and/or form of the volume, and establishing a track between the volume and the matched volumes at the subsequent periods in time.

15. The system of claim 1, further comprising:
the ranging sensor.

16. The system of claim 15, wherein the ranging sensor is a LIDAR sensor.

17. The system of claim 1, wherein the sensor output is generated by the ranging sensor during rotation of the ranging sensor at the sensor location.

18. A method of tracking subjects within a three-dimensional environment, the method being implemented in a computer system including one or more physical processors and storage media storing machine-readable instructions, the method comprising:
receiving sensor output from a ranging sensor that is rotationally mounted at a sensor location in an environment, such sensor output including detected ranges of surfaces of the environment as a function of orientations from the sensor location such that the ranges and the orientations of the surfaces are specified as polar coordinates with respect to a coordinate system origin at the sensor location; and
identifying a continuous surface of an object using the using detected ranges and orientations as the polar coordinates by determining range changes between adjacent polar coordinates, wherein the continuous surface is identified based on the range changes between the adjacent polar coordinates of the continuous surface not differing more than a threshold distance, and wherein a surface location of the continuous surface as a whole is characterized by the adjacent polar coordinates which do not differ more than the threshold distance.

19. The method of claim 18, further comprising determining whether the continuous surface is a static surface or a moving surface.

20. The method of claim 19, wherein determining whether the continuous surface is a static surface or a moving surface is based on whether the polar coordinates of the continuous surface change over time.

21. The method of claim 18, further comprising determining whether the continuous surface is associated with a human being.

22. The method of claim 21, wherein determining that the continuous surface is associated with a human being comprises determining whether a volume bounded by the continuous surface has a size, shape, and/or form that is indicative of a size, shape, and/or form corresponding to that of a human being.

23. The method of claim 21, wherein determining that the continuous surface is associated with a human being comprises determining whether a volume bounded by the continuous surface has a size, shape, and/or form that is indicative of a size, shape, and/or form corresponding to that of a human head.

24. The method of claim 18, further comprising determining whether the continuous surface includes an obscured edge or a non-obscured edge of a volume bounded by the continuous surface.

25. The method of claim 24, wherein determining whether the continuous surface includes an obscured edge comprises using detected ranges and orientations of a second surface that is positioned adjacent to the continuous surface, and determining whether detected ranges of the second surface are closer to the sensor location than the detected ranges of the continuous surface.

26. The method of claim 24, wherein determining that the continuous surface includes a non-obscured edge comprises using detected ranges and orientations of a second surface that is positioned adjacent to the continuous surface, and determining whether detected ranges of the second surface are farther from the sensor location than the detected ranges of the continuous surface.

27. The method of claim 18, wherein the received sensor output comprises measurements representing measured ranges and orientations from the sensor location of points on the surfaces, wherein a first group of measurements include measured ranges and orientations from the sensor location of a set of points on the continuous surface at a period in time at which the first group of measurements were taken.

28. The method of claim 27, further comprising:
determining a size, shape, and/or form of a volume bounded by the continuous surface based on the first group of measurements, wherein the first group of measurements is inherently grouped based on the measured ranges and orientations from the sensor location of the set of points.

29. The method of claim 28, wherein the volume is determined to be associated with a human being based on whether the determined size, shape, and/or form of the volume corresponds to that of a human head.

30. The method of claim 28, further comprising:
    tracking the movement of the volume through the environment.

31. The method of claim 30, wherein tracking the movement of the volume through the environment includes matching sizes, shapes, and/or forms of volumes bounded by surfaces represented by groups of measurements taken at subsequent periods in time with the determined size, shape, and/or form of the volume, and establishing a track between the volume and the matched volumes at the subsequent periods in time.

32. The method of claim 18, wherein the sensor output is generated by the ranging sensor during rotation of the ranging sensor at the sensor location.

\* \* \* \* \*